United States Patent [19]

Gafford et al.

[11] Patent Number: 4,596,200
[45] Date of Patent: Jun. 24, 1986

[54] ROW CROP PLANTER

[75] Inventors: Alexander T. Gafford; David L. Murray, both of La Porte, Ind.

[73] Assignee: Deutz-Allis Corporation, Milwaukee, Wis.

[21] Appl. No.: 592,733

[22] Filed: Mar. 22, 1984

Related U.S. Application Data

[63] Continuation of Ser. No. 413,979, Sep. 2, 1982, abandoned.

[51] Int. Cl.⁴ .................................................. A01C 5/06
[52] U.S. Cl. ......................................................... 111/85
[58] Field of Search ................................. 111/2, 3, 63

[56] References Cited

U.S. PATENT DOCUMENTS

| | | | |
|---|---|---|---|
| 222,042 | 11/1879 | Haworth | 111/79 |
| 564,604 | 7/1896 | Fairchild | |
| 697,479 | 4/1902 | Hardcastle | 111/81 X |
| 1,057,141 | 3/1913 | Garst | 172/538 |
| 1,150,537 | 8/1915 | Roby | 111/85 X |
| 1,972,703 | 9/1934 | Collins | 111/63 |
| 2,003,390 | 6/1935 | Poll et al. | 111/3 |
| 2,685,243 | 8/1954 | Cole | |
| 2,691,353 | 10/1954 | Secondo | |
| 2,771,044 | 11/1956 | Putifer | 111/85 |
| 2,924,189 | 2/1960 | McLeod | |
| 3,362,361 | 1/1968 | Morrison | 111/85 X |
| 3,450,074 | 6/1969 | Gatzke et al. | |
| 3,524,419 | 8/1970 | Middleton et al. | 111/85 X |
| 4,009,668 | 3/1977 | Brass et al. | |
| 4,112,857 | 9/1978 | Bradley | 111/3 |
| 4,275,671 | 6/1981 | Baker | 111/85 |
| 4,307,674 | 12/1981 | Jennings et al. | 111/85 |
| 4,356,780 | 11/1982 | Bauman | 111/85 |

FOREIGN PATENT DOCUMENTS 179314  5/1962  Sweden ................................. 111/52

Primary Examiner—Robert A. Hafer
Assistant Examiner—Danton DeMille
Attorney, Agent, or Firm—Charles L. Schwab

[57] ABSTRACT

A row crop planter unit (12) has seed trench forming dixc openers (31, 32) followed by a pair of equalizer mounted planter unit support and gauge wheels (50, 64) having slicing discs (61, 66) secured to the laterally inner sides serving to cut the banks of the seed trench (39) and cover the seed (102) deposited in the trench. A press wheel (101) is provided to insure closing of the trench (39) over the seed.

7 Claims, 10 Drawing Figures

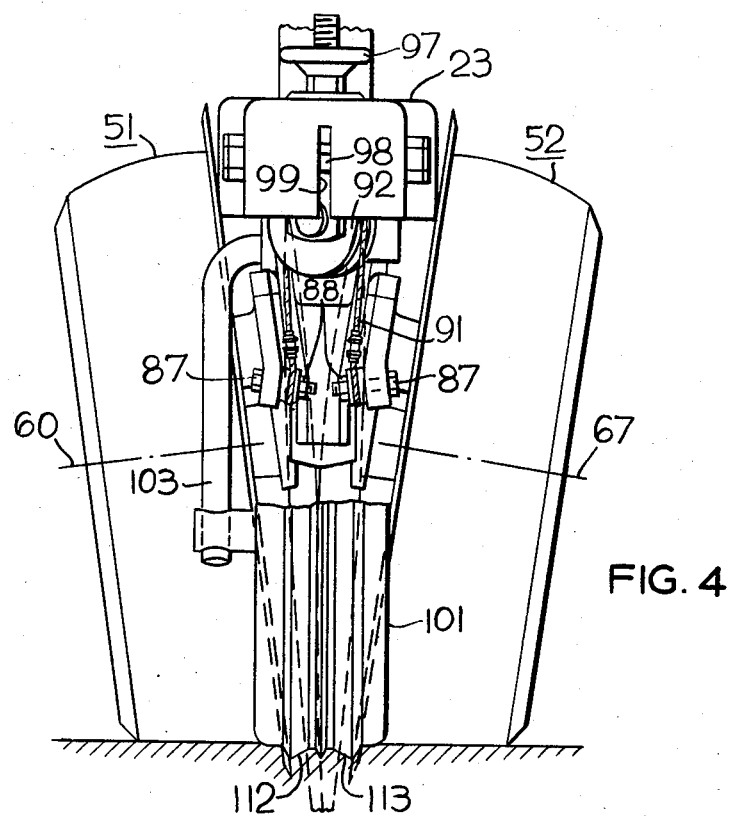
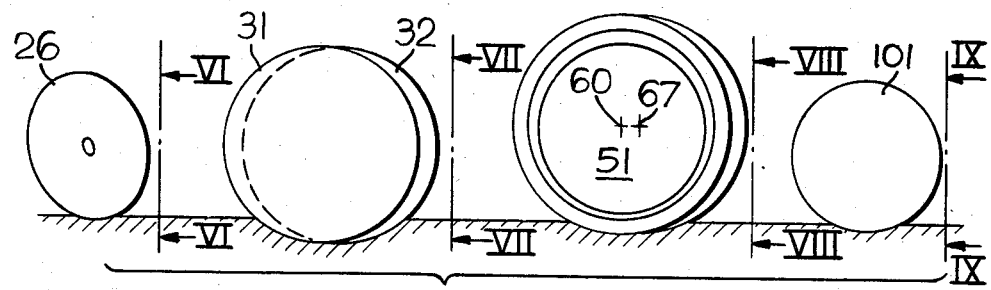
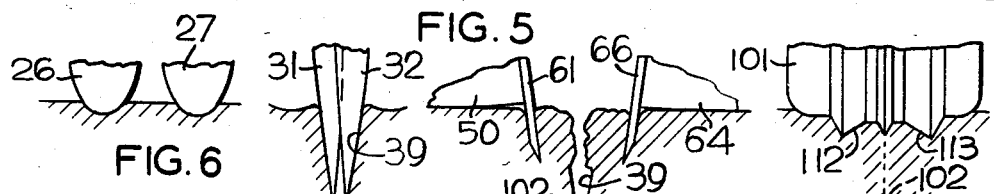
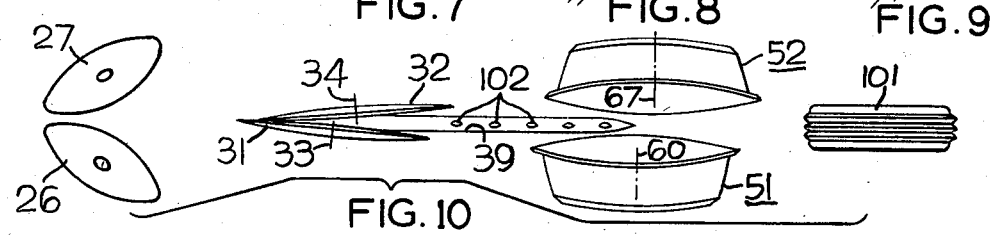

ROW CROP PLANTER

This application is a continuation of application Ser. No. 413,979, filed Sept. 2, 1982, now abandoned.

BACKGROUND OF THE INVENTION

1. Technical Field

This invention relates to a row crop planter and, more particularly, to a planter unit having means for forming a seed trench, closing the seed trench and gauging planting depth.

2. Prior Art

Heretofore, others have provided disc openers for forming a seed trench. U.S. Pat. No. 564,604, for instance, discloses a pair of staggered discs for opening a seed trench. In U.S. Pat. No. 2,924,189, a pair of rearwardly converging vertical discs are employed to simultaneously mulch the marginal portions of the furrow and close the furrow or seed trench. The before-mentioned discs may also be used to create mulch for small seeds deposited on top of the soil. In U.S. Pat. No. 2,691,353, a pair of discs are used to create a seed trench followed by a pair of discs employed to close the seed trench over deposited seed. In U.S. Pat. No. 3,450,074, a combined disc opener and gauge wheel is utilized for planting. In U.S. Pat. No. 2,685,243, a pair of planter gauge wheels are disposed at the laterally outer sides of a pair of disc openers with the gauge wheels individually vertically adjustable relative to the disc openers. In U.S. Pat. No. 4,009,668, a pair of gauge wheels are disposed at laterally opposite sides of a pair of disc openers and in rearwardly offset relation thereto so each gauge wheel engages the ground at about the point the associated disc opener leaves the ground.

SUMMARY OF THE INVENTION

The present invention contemplates the use of a pair of combined gauge wheel and seed trench closing means which serve to close a seed trench, control the depth planting and support the planting unit. By combining seed furrow closing discs with gauge wheels, the weight of the planter unit is used to insure proper penetration of the closing discs and thus, proper covering of the seeds deposited in the furrow. The present invention finds particular utility in a row crop planter unit adapted for connection in towed relation to a draft appliance, such as a tool bar, and each planter unit includes a frame on which a trench forming means, such as disc openers are mounted. Upon movement of the planter unit through the field in a planting operation, the trench forming means cuts a seed receiving trench in the soil so as to receive kernels of seed deposited by seed drop means. The planter also includes ground engaging means for covering the deposited seeds, controlling depth of planting and supporting the planting unit as it performs its planting function. The ground engaging means includes a pair of laterally spaced slicing discs rotatably supported on the frame and operable to slice the soil at laterally opposite sides of and in close proximity to the seed receiving trench whereby the soil defining the opposite sidewalls of the trench is moved laterally inwardly to close the trench over the seed. The ground engaging means also includes a pair of gauge wheels adjacent the laterally outer sides of the slicing discs and connected to the latter to coaxially rotate therewith. The gauge wheels are not only operable to control the depth of planting, but also support the planter unit. The planter unit may also include press wheel means disposed rearwardly of the ground engaging means to urge the slices of soil firmly into the trench in covering relation to the deposited seed.

BRIEF DESCRIPTION OF THE DRAWINGS

One embodiment of the invention is illustrated in the drawings in which:

FIG. 4 is a rear view of the lower portion of the planter unit with parts broken away for illustration purposes;

FIG. 5 is a schematic view showing the ground engaging components of the planter unit of FIG. 1;

FIG. 6 is a view taken along the line VI—VI in FIG. 5;

FIG. 7 is a view taken along the line VII—VII in FIG. 5;

FIG. 8 is a view taken along the line VIII—VIII in FIG. 5;

FIG. 9 is a view taken along the line IX—IX in FIG. 5; and

FIG. 10 is a schematic top view of the components illustrated in FIG. 5.

DETAILED DESCRIPTION OF THE DRAWINGS

Figure 1:
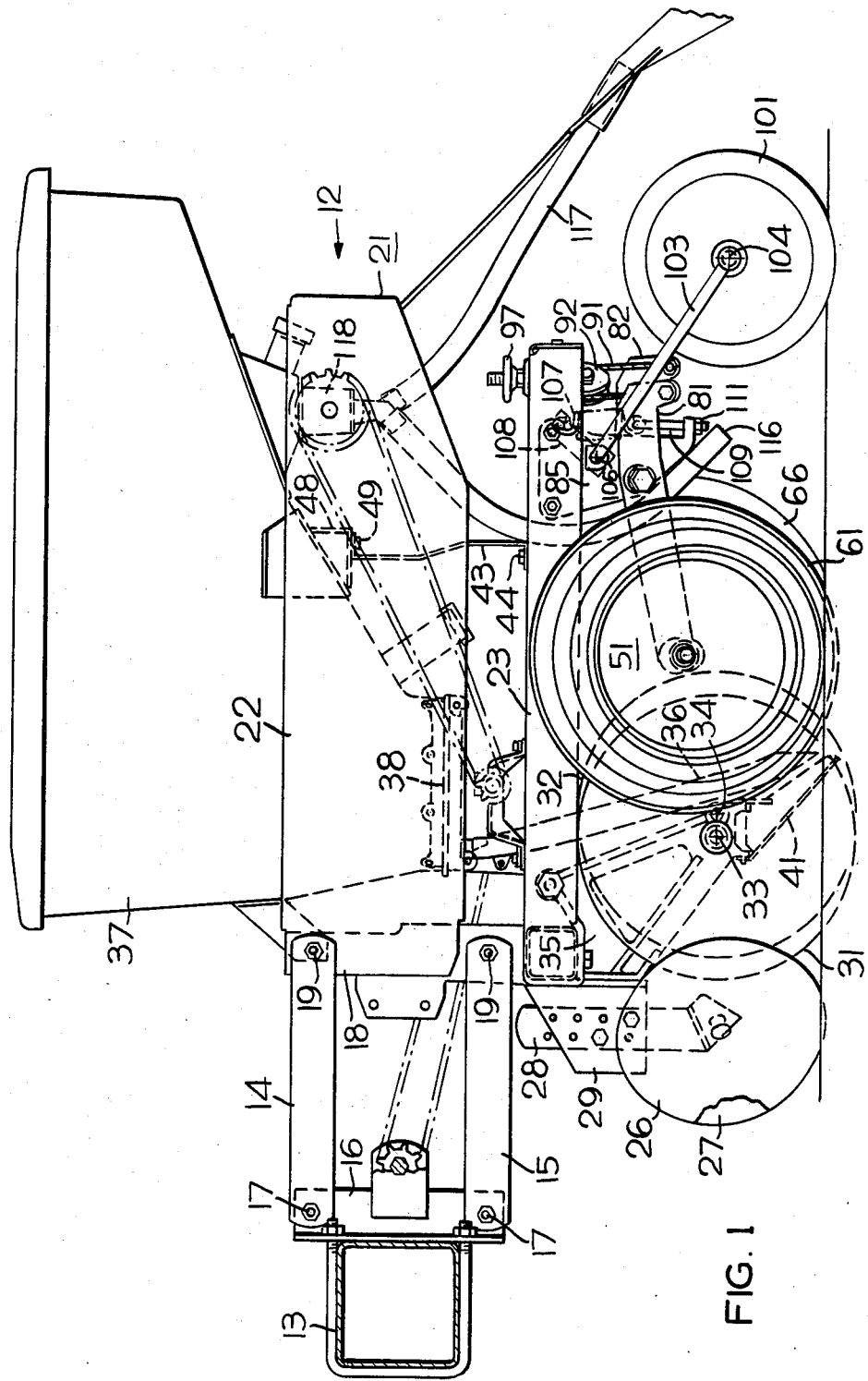
FIG. 1 is a side view of a planter unit.
Figure 3:
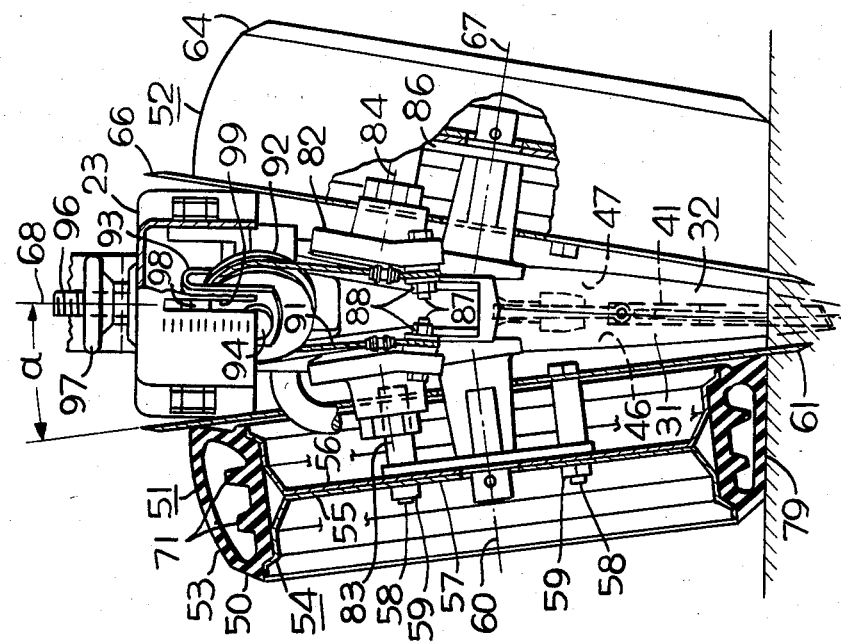
FIG. 3 is a rear view of the showing of FIG. 2 with parts broken away for illustration purposes.
Figure 2:
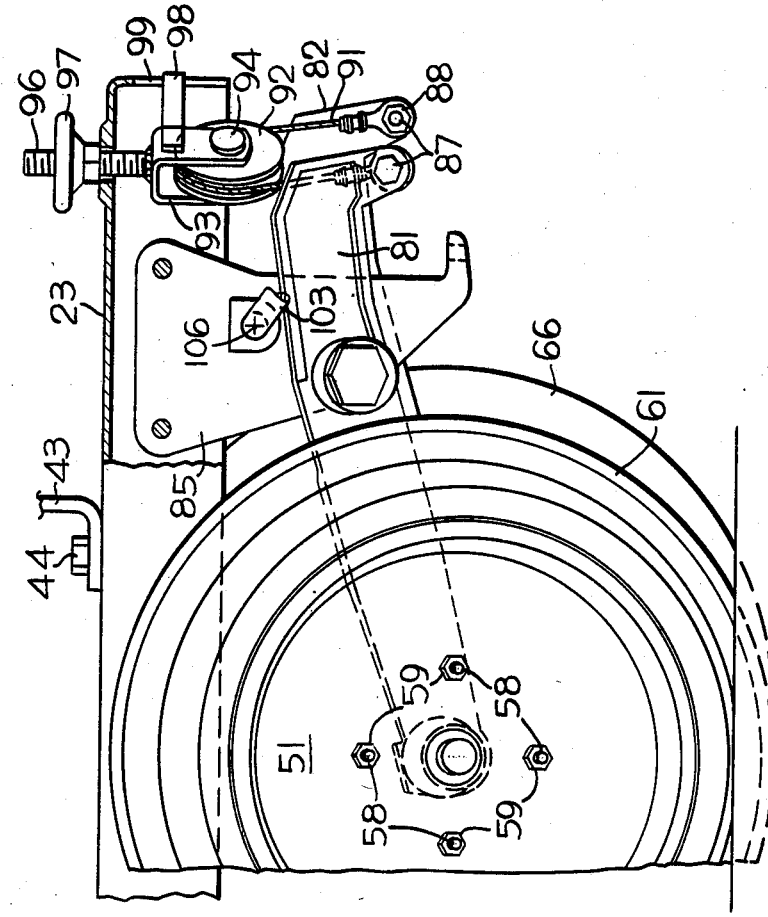
FIG. 2 is an enlarged partial side view showing the combined gauge wheel and closing disc unit used in the present invention.

Referring to FIGS. 1 through 4, a planter unit 12 is connected to a draft appliance in the form of a tool bar 13 by a pair of parallel links 14, 15. The forward ends of the links 14, 15 are pivotally connected on parallel transverse horizontal axes to a tool bar bracket 16 by pivot bolts 17 and the rear ends of the links 14, 15 are pivotally connected to a mast portion 18 of a planter unit frame 21 by a pair of transverse pivot bolts 19. The tool bar 13 may be connected to a tractor hitch or may be towed by a tractor in which event vertically adjustable wheels (not shown) would be mounted on the tool bar for raising and lowering the latter. Appropriate stops or lift abutments, not shown, are provided to cause lifting of the planter unit 12 upon predetermined raising of the tool bar 13. The planter unit frame 21 includes an upper subframe 22 and a lower subframe 23 with the mast portion 18 interconnecting the subframes. A pair of forwardly converging trash clearing discs 26, 27 are rotatably mounted on a vertically adjustable disc support 28 in a lead position at the front of the frame 21. The support 28 is adjustably secured to bracket structure 29 extending forwardly from the subframe 23. Soil cutting seed trench forming means in the form of a pair of disc openers 31, 32, which are staggered in the fore and aft direction, are rotatably mounted on longitudinally spaced axes 33, 34 on a support 35 rigidly secured to the subframe 23. The front ends of the disc openers 31, 32 are disposed between the rear portions of the trash removing discs 26, 27. In other words, the rear portions of the trash removing discs 26, 27 are disposed at the laterally outer sides of the front portions of the seed trench opening discs 31, 32. A scraper mechanism 41 is provided to clean the laterally inner faces or surfaces 46, 47 of the trench opening discs 31, 32.

A seed tube 36 deposits seed in the trench 39 formed by the trench forming discs 31, 32 as seed is delivered from the seed hopper 37 by a plate-type seed singulator mechanism 38. The seed hopper 37 is pivotally connected at its forward end by the upper pivot bolt 19, which also serves to pivotally connect the upper parallel link 14 to the mast 24 of the frame 21. An intermediate portion of the seed hopper 37 is supported on an upstanding bracket 43 secured at its lower end to the subframe 23 by a cap screw 44. An upper horizontal portion of the bracket 43 is secured to a cradle part 48 of the hopper by a cap screw 49.

The support of the floatingly mounted planter unit 12, the gauging of planting depth and the closing of the seed receiving trench is achieved by a pair of ground engaging means in the form of a pair of combined slicing discs and gauge wheel assemblies 51, 52. Referring specifically to assembly 51, the assembly includes a gauge wheel 50 comprised of a zero pressure tire 53 mounted on a rim 54 having two parts 55, 56 which are secured to a hub 57 by four bolts 58 and four nuts 59. The hub 57 is mounted on the forward end of a walking beam 81 for rotation about a generally transverse axis 60. A slicing disc 61 of greater diameter than the tire 53 is also secured to the hub 57 by the bolts 58 and nuts 59 so as to be rigidly secured thereto for rotation with the tire 53 about the axis 60 of the gauge wheel assembly 51. The laterally inner edge of the tire 53, at its tread surface 79, is in 360 degrees contact with the laterally outer surface of the slicing disc 61. The combined gauge wheel and slicing disc assembly 52 is similarly comprised of a gauge wheel 64 and a slicing disc 66 secured to a hub 86 mounted on the front end of a walking beam 82 for rotation about a generally transverse axis 67. The slicing discs 61, 66 are disposed at an angle "a" of approximately 8° from a vertical longitudinal plane 68 and therefore have an included angle therebetween of approximately 16°. It is believed the included angle can be varied from near zero to 30° and still provide a satisfactory trench closing function. In the illustrated embodiment of the invention, this angle is fixed rather than adjustable for the sake of simplicity of construction. As shown in FIG. 1, the forward portions of the slicing discs 61, 66 overlap a major part of the rear portions of the trench forming discs 31, 32 and the leading edges of the slicing discs 61, 66 enter the soil at about the longitudinal position along the trench that trailing edges of the adjacent trench forming discs 31, 32 leave the soil. Thus, soil lifted from the sidewalls of the trench and thrown upwardly and laterally outward by the trench forming discs during a planting operation will be blocked and deflected laterally inward by the slicing discs 61, 66 to cover the seed in the trench.

It will be noted the zero pressure tire 53 has built-in support ribs 71 in abutting relation to the flexible ground engaging tread portion 79 of the tire 53 to provide a firm support for the tread portion when the latter engages the ground. The flexing of the tread portion of the tire causes sticky soil to fall off, thereby preserving the integrity of the gauging function of the gauge wheel. The slicing discs 61, 66 are disposed at a preferred slight angle of one and one-half degrees to the direction of travel of the planting unit during the planting operation. In the illustrated embodiment of the invention, this angle is less than the angle of convergence of the trench forming discs 31, 32. In other words, the slicing discs are rearwardly converging in a fore and aft direction with a total included angle of three degrees. It is believed satisfactory seed covering can be achieved with the slicing discs set at, or rearwardly converging at, between a zero degree included angle and a twenty degrees included angle. The trench filling and gauge wheel assemblies 51, 52 are individually mounted on the pair of walking beams 81, 82 which are pivotally mounted intermediate their ends to a bracket 85 on axes 83, 84 longitudinally spaced from one another a distance which corresponds to the staggered relationship or spacing of the axes 60, 67 of the slicing discs 61, 66. The axis 83 is parallel to the axis 60 and the axis 84 is parallel to the axis 67. Also the spacing between axes 33, 34 is equal to the spacing between axes 60, 67. The hubs 57 and 86 of the gauge wheels 50, 64 are rotatably mounted on the forward ends of the walking beams 81, 82 and the rear ends of the beams 81, 82 are connected by bolts 87 and nuts 88 to opposite ends of a cable 91 which is reeved about a grooved pulley 92 rotatably mounted on a U-shaped support 93 by a pivot pin 94. A threaded rod 96 has its lower end welded to the pulley support 93 and a hand wheel or nut 97 has a threaded bore in threaded engagement with the threaded rod 96. The beams 81, 82, the cable 91 and the pulley 92 provide an equalizer mechanism or walking beam support for the gauge wheels 53, 64. By turning the hand wheel 97, the elevation of the planter unit 12 is adjusted whereby the depth of the seed trench can be varied so as to change the depth of planting. A finger 98 is welded to the pulley support 93 and its free end extends through a vertical slot 99 in the lower subframe 23 to prevent the support 93 from turning from its illustrated position. The equalizer mechanism minimizes seed trench deviations caused by the gauge wheels rolling over rocks, clods or the like.

Trench firming wheel means in the form of a press wheel 101 is provided to insure coverage of the seed 102 as shown in FIG. 9. The press wheel is mounted on a wheel support lever 103 for rotation about a transverse axis 104 and the front of the lever 103 is pivotally mounted on a transverse axis 106 on the bracket 85, which in turn is secured to the unit subframe 23. The press wheel 101 is resiliently biased into ground contact by a tension coil spring 107 connected at its upper end to an arm 108 on lever 103 and connected at its lower end to the bracket 85 through an eye bolt 109 whose lower threaded end carries a nut 111. As shown in FIGS. 4 and 9, the press wheel includes a pair of axially or laterally spaced and laterally and radially inwardly converging conical tread surfaces 112, 113 which engage the sliced soil at opposite sides of the trench 39.

The hopper 37 is divided into three separate compartments by suitable means, not shown, so as to hold suitable quantities of seed, herbicide and insecticide. The insecticide and the herbicide, delivered, respectively, through tubes 116, 117, are metered by a metering device 118 driven by a chain and sprocket arrangement.

OPERATION

During a planting operation, as illustrated in the drawings, the planter unit 12 floats in relation to the tool bar 13 to which it is connected by parallel links 14, 15. Thus, the planter unit is supported by the combined earth slicing disc and gauge wheel assemblies 51, 52. The weight of the planter unit puts down pressure on both the seed trench furrow opening discs 31, 32 and the slicing discs 61, 66 to not only insure formation of a narrow seed trench but also insure vertical slicing of narrow bands of soil from the opposite sides or banks of the seed trench and laterally inward shifting of said bands of soil to cover the deposited seed. Since the slicing or covering discs 61, 66 along with the gauge wheels 50, 64 bear the weight of the planter unit, penetration of hard soil is achieved and a constant amount of soil is moved to cover the deposited seed. The planter support wheels 50, 64 are in close proximity to the trench forming discs and, thus, the depth of the seed trench, and hence the planting depth, is not adversely affected by ordinary changes in ground contour found in most fields. The effect on planting depth of encountering clods, stones or similar abrupt irregularities in the ground surface is reduced by the equalizer mechanism formed by the walking beams 81, 82, the cable 91 and the pulley 92. Having the seed covering discs 61, 66 at the points of gauge wheel support also insure uniform soil penetration over uneven ground and adequate covering of the seed deposited in the trench by the singulating mechanism 38 and seed tube 36. If the slicing discs 61, 66 where located a substantial distance from the gauge wheels, the penetration of the slicing discs would not be uniform when uneven ground is encountered.

The spring-loaded trench firming wheel 101 with its conical tread surfaces 112, 113 additionally insures seed coverage and firms the ground in the trench covering the seed.

In summary, our invention provides both accurate depth control and good seed coverage by use of slicing discs to cut the banks of the seed trench and gauge wheels close to both the slicing discs and the seed trench forming means. As shown in FIG. 8, the slicing discs 61, 66 penetrate the soil at laterally opposite sides of the trench 39 in downward directions generally parallel to the sidewalls, respectively, of the trench so as to slice generally vertical bands of soil defining the trench sidewalls from the opposite banks of the trench 39 and laterally shift the bands of soil defining the trench sidewalls inwardly, as shown in FIG. 8, to close the trench over the seed 102. In other words, the soil of the sidewalls or banks defining the trench 39 are shifted laterally inward to cover the seed 102. The gauge wheels 50, 64 not only determine the depth of penetration of the slicing discs 61, 66 but also support the planter unit and determine the planting depth by controlling the depth of penetration of the seed trench forming discs 31, 32.

The embodiments of the invention in which an exclusive property or privilege is claimed are defined as follows:

1. A planter unit adapted for connection in toward relation to a draft applicance in a manner permitting floating vertical movement relative thereto, said planter unit being characterized by
   a frame,
   a pair of upright forwardly converging trench forming discs rotatably mounted on said frame for movement therewith and operable to cut a narrow seed receiving trench in the soil defined by laterally spaced sidewalls when said unit is moved in a predetermined path in a field to be planted,
   seed drop means mounted on said frame for depositing kernels of seed in said trench, and
   ground engaging means for covering the deposited seeds, controlling depth of planting and supporting said unit as it performs its planting function including
   a pair of laterally spaced upright slicing discs rotatably supported on said frame on generally transverse axes and in adjacent trailing relation to said trench forming discs, said silcing discs being substantially flat and having forward portions in outboard lapped relation to the rear portions of said trench forming discs whereby during a planting operation the leading edge of each of said slicing discs enters the soil at a longitudinal position along said trench so as to deflect soil that the trailing edge of the adjacent trench forming disc has thrown upwardly and laterally outward as it leaves the soil, said slicing discs converging rearwardly with each being disposed at an angle to the direction of travel during a planting operation which is less than the angle of convergence of said trench forming discs, said slicing disc being operable to slice narrow and substantially vertical bands of soil including said sidewalls from the laterally opposite sides of said trench and to shift said bands laterally inward in covering relation to said seed,
   a pair of gauge wheels adjacent, respectively, the laterally outward sides of said slicing discs and secured to the latter to coaxially rotate therewith, said gauge wheels being of smaller diameter than said slicing discs and operable to support said planter unit, limit the depth of penetration of said slicing discs and determine the depth of said seed receiving trench and
   means operable to vertically adjust said ground engaging means relative to said frame to thereby change the depth of said seed receiving trench.

2. The combination of claim 1 wherein said trench forming discs are staggered relative to one another and said slicing discs are staggered relative to one another in the direction of travel of the planter unit during a planting operation.

3. The combination of claim 1 wherein said gauge wheels include tires having flexible treads with laterally inner edges in 360 degree contact with the laterally outer sides of said slicing discs, respectively.

4. The combination of claim 1 and further comprising trench firming wheel means rearwardly of said ground engaging means urging said slices of soil firmly into said trench in covering relation to the deposited seed.

5. A planter unit adapted for connection in towed relation to a draft appliance in a manner permitting floating vertical movement relative thereto, said planter unit being characterized by
   a frame,
   a pair of upright forwardly converging trench forming discs rotatably mounted on said frame for movement therewith and operable to cut a narrow seed receiving trench in the soil defined by laterally spaced sidewalls when said unit is engaged in a planting operation,
   seed drop means mounted on said frame for depositing seed in said trench when said unit is engaged in a planting operation, and
   ground engaging means operable to cover deposited seed, control depth of planting and support said unit when it is engaged in a planting operation including
   a pair of laterally spaced upright slicing discs rotatably supported on said frame on generally transverse axes in adjacent trailing relation to said trench forming discs and oriented generally in the fore and aft direction, said slicing discs being substantially flat and having forward portions in outboard lapped relation to the rear portions of said trench forming discs whereby during a planting operation the leading edge of each of said slicing discs enters the soil at a longitudinal position along said trench so as to deflect soil that the trailing edge of the adjacent trench forming disc has thrown upwardly and laterally outward as it leaves the soil, said slicing discs each being disposed at an angle to the direction of travel in a planting operation which is less than the angle of convergence of said trench forming discs whereby said slicing discs are in rearwardly converging relation to one another and said slicing discs being operable to slice narrow and substantially vertical bands of soil including said sidewalls from the laterally opposite sides of said trench and to shift said bands laterally inward in covering relation to said deposited seed, said slicing discs penetrating the soil at laterally outward sides, respectively, of said trench in downwardly extending directions generally parallel to the sidewalls of said trench, a gauge adjacent the laterally outer side of each of said slicing discs and secured thereto to rotate concentrically therewith, said gauge wheels serving to support the planter unit, limit the depth of penetration of said slicing discs and determine the depth of said seed receiving trench and vertical adjustment means on said frame and connected to said ground engaging means operable to vertically adjust the latter relative to said frame to thereby vary the depth of said seed receiving trench and the depth of planting.

6. The planter unit of claim 5 wherein the trench forming disc at one lateral side of said planter unit is in a forward staggered relation to the other trench forming disc and wherein the slicing disc at said one lateral side of said planter unit is in a forward staggered relation to the other slicing disc.

7. A plantar unit adapted for connection in towed relation to a draft appliance in a manner permitting floating vertical movement relative thereto, said planter unit being characterized by a frame, a seed hopper mounted on said frame, a pair of upright forwardly converging trench forming discs rotatably mounted on said frame for movement therewith and operable to cut a narrow seed receiving trench in the soil defined by laterally spaced sidewalls when said unit is moved in a predetermined path in a field to be planted, seed drop means mounted on said frame and operatively associated with said hooper for depositing kernels of seed in said trench, and ground engaging means for covering the deposited seeds, controlling depth of planting and supporting said unit as it performs it planting function including, a pair of wheel assemblies supporting said frame, each including a wheel having a tire with a flexible ground engaging tread portion and a substantially vertical slicing disc of greater diameter than said tire secured to said wheel in coaxial relation to and at one lateral side of said wheel, said wheel assemblies being substantially reverse images of one another in side-by-side laterally spaced relation to one another with the slicing discs on the laterally inward sides of said tires in adjacent trailing relation to said trench forming discs and oriented substantially in a fore and aft directions, said slicing discs being substantially flat and having forward portions in outboard lapped relation to the rear portions of said trench forming discs whereby during a planting operation the leading edge of said slicing discs enters the soil at a longitudinal position along said trench so as to deflect soil that the trailing edge of the adjacent trench forming disc has thrown upwardly and laterally outward as it leaves the soil, said slicing discs each being disposed at an angle to the direction of travel in a planting operation which is less than the angle of convergence of said trench forming discs whereby said slicing discs are in rearwardly converging relation to one another and operative during a planting operation to slice narrow vertical bands of soil including said sidewalls from the laterally opposite sides of said trench and to shift said bands laterally inward in covering relation to said deposited seed, wheel assembly support means rotatably supporting said wheel assemblies, and means connecting said support means to said frame including adjustment means for selectively varying the vertical position of said frame relative to said wheel assemblies thereby varying the depth of said seed receiving trench and the depth of planting.

* * * * *

UNITED STATES PATENT OFFICE
CERTIFICATE OF CORRECTION

Patent No. 4,596,200          Dated   June 24, 1986

Inventor(s) Alexander T. Gafford and David L. Murray

It is certified that error appears in the above-identified patent and that said Letters Patent are hereby corrected as shown below:

Column 5, line 47, "toward" should read --- towed ---;

line 67, "silcing" should read --- slicing ---;

Column 6, line 12, "disc" should read --- discs ---;

Column 8, line 4, "hooper" should read --- hopper ---;

line 7, "it" (second occurrence) should read --- its ---.

Signed and Sealed this

Seventh Day of October, 1986

[SEAL]

*Attest:*

DONALD J. QUIGG

*Attesting Officer*          *Commissioner of Patents and Trademarks*